June 10, 1958     W. A. RAY     2,838,068

ELECTROMAGNETIC VALVE

Original Filed Feb. 10, 1951

WILLIAM A. RAY,
      INVENTOR.

BY *Flam and Flam*

ATTORNEYS

United States Patent Office 2,838,068
Patented June 10, 1958

2,838,068

ELECTROMAGNETIC VALVE

William Alton Ray, North Hollywood, Calif., assignor to General Controls Co., Glendale, Calif., a corporation of California Original application February 10, 1951, Serial No. 210,409, now Patent No. 2,719,939, dated October 4, 1955. Divided and this application December 11, 1953, Serial No. 405,972

2 Claims. (Cl. 137—625.33)

This invention relates to electromagnectically operated mechanisms, and particularly to those capable of responding to small electric currents. Such mechanisms are especially useful for operating valves in gas burner control systems in which the controlling current is obtained by thermoelectricity or photoelectricity.

This application is a division of application Serial Number 210,409, filed in the name of William A. Ray on February 10, 1951, and entitled "Electromagnetic Valve," now Patent No. 2,719,939.

It is an object of the present invention to provide an electromagnetic valve structure that is capable of controlling substantial flow of fluid where only minute current is available. For this purpose, use is made generally of an electromagnet having an enlarged polar area. In order to minimize the effective reluctance of the magnetic circuit so that the small currents operating the electromagnet may have maximum effect in operating a valve of substantial size, use is made of a particular valve structure that permits substantial flow upon only a small movement of the armature closure. By the use of such a valve, the armature may be spaced close to the pole face of the electromagnet when the electromagnet is deenergized. Accordingly, the air gap is of small size, and a large force is available to act on the armature to open the valve.

It is another object of this invention to provide a novel valve structure in which sobstantially the entire area of the armature closure is subjected to the inlet pressure. In this manner, lifting of the armature closure by the electromagnet is not materially opposed by the inlet pressure. To accomplish this purpose, the valve body wall separating the inlet and outlet has two aligned spaced openings. A flanged, generally tubular seat-forming member extends between the openings on the outlet side of the wall, the interior of the tubular member being continuously exposed to the inlet through one end, the exterior of the member being exposed to the outlet. The armature closure rests upon an annular seat formed about the other ene of the tubular member when closing the valve.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Figure 1:
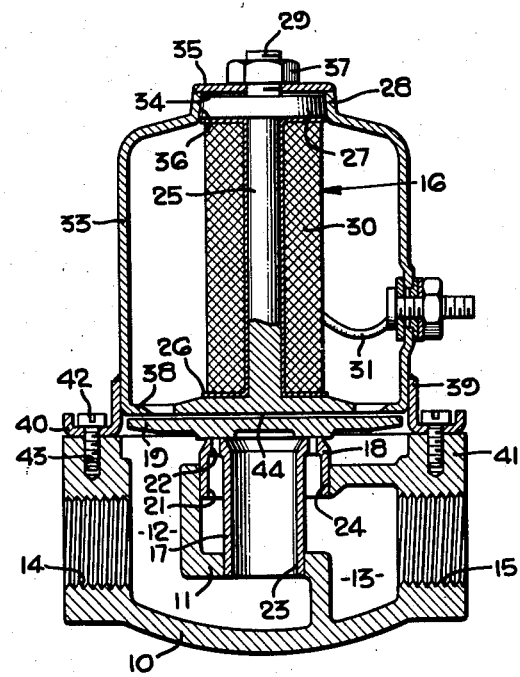
Figure 1 is an axial section through a valve incorporating the invention.
Figure 2:
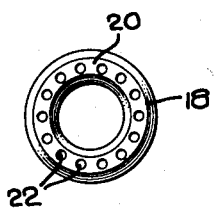
Fig. 2 is a plan view of the valve seat, taken as indicated by line 2—2 of Fig. 1.

In Figs. 1 and 2, there is illustrated a valve body 10 having a partition 11 dividing the interior of the valve into an inlet chamber 12 and an outlet chamber 13. The valve body 10 has appropriate threaded bores 14 and 15 communicating, respectively, with the inlet chamber 12 and the outlet chamber 13 for cooperation with inlet and outlet conduits (not shown).

The valve body 10 is open at the top side, as shown in the drawings, for cooperation with an electromagnet assembly 16 to be hereinafter more fully described.

Figure 3:
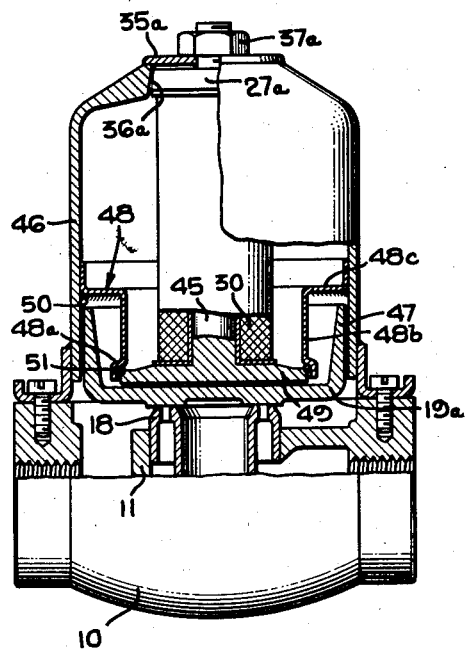
Fig. 3 is a view similar to Fig. 1, illustrating another embodiment of this invention.

A partition 11 extends across the valve body 10, encompassing the outlet bore 15. A seat member 17, generally of open tubular form, is accommodated in the partition 11 to provide an annular valve seat 18 through which fluid discharges. A disc-type closure member 19, as shown in Fig. 1, or a closure 19a, as shown in Fig. 3, cooperates with the valve seat 18 for permitting or preventing passage of fluid through the valve, in accordance with the energization of the electromagnet 16.

The valve seat is formed in the tubular seat member 17 by a flat annular portion 20 at the upper end of the member 17 that connects the main body portion of the member 17 and a down-turned flange 21. The annular portion 20 has a plurality of annularly arranged apertures forming discharge ports 22.

The partition 11 is of a particular configuration, so that the inlet chamber 12 extends for a considerable distance beneath it.

The wall 11, sepaarting the inlet chamber 12 from the outlet chamber 13, has a horizontal portion extending over the chamber 13. The tubular seat-forming member 17 is firmly attached to the wall 11 as by the flange 21 engaging the aperture 24, and by the lower end engaging in an aperture 23 in the lower horizontal portion of wall 11. Obviously, unless ports 22 are open, the inlet chamber 12 is out of communication with outlet chamber 13. However, the interior of member 17 is in communication with the inlet.

The interior of the tubular member 17 extends the inlet chamber 12 in order that the annularly arranged outlet ports 22 be surrounded by the inlet chamber on all sides, so that, even upon a slight lifting of the closure 19 or 19a from the seat 20, substantial volumes of fluid may readily pass through the ports 22. Accordingly, to control a given volume of fluid, only a small lifting of the closure 19 or 19a is necessary.

Referring particularly to Fig. 1, the electromagnet assembly 16 comprises a cylindrical core 25 of relatively small diameter, with an enlarged pole piece 26 at its lower end providing a large polar area for attracting the closure 19. The upper end of the core 25 is provided with a large circular head 27 having a tapered exterior surface 28 and a threaded extension 29. The pole piece 26 and the head 27 may both be integral with the core 25. An energizing coil 30 is wound on the core 25, and is adapted to be connected through appropriate leads such as 31 with a source of electric energy, such as a thermoelectric generator or an electron multiplier tube (not shown).

An inverted cup or shell 33, which may be formed of sheet metal having good magnetic qualities, is secured on core 25 in a manner to provide a joint of low reluctance. For this purpose, the top of the shell 33 is provided with a reduced tapered opening 34, closed by a cap 35 secured, as by welding, to the shell 33, and forming a recess 36 for accommodating the head 27.

A nut 37, threaded on the extension 29, serves, by engagement with the cap 35, to urge head 27 tightly into engagement with the wall of the recess 36.

The lower end portion of the shell 33 has an inturned edge or annular flange 38 forming a substantial polar surface extending about the pole piece 26, and cooperating therewith to attract the closure 19, which is of magnetic material. The flange 38 may provide a polar area substantially equal to that provided by pole piece 26. The parts are so proportioned that, when the core 25 is tightly secured to the shell 33, the lower surface of the flange 38 lies in the plane of the polar area of pole piece 26.

The shell 33 has an exterior extension 39 at its lower end secured to the shell 33, as by welding, and providing an outwardly directed annular flange 40 by which the shell 33 is secured in fluid-tight relation to the valve body 10, circumscribing the top opening of the body 10. The flange 40 cooperates with an annular flange 41 of the body 10, and is secured thereto by a plurality of bolts 42 accommodated in appropriate threaded bores 43 of the body 10. The shell 33 accordingly forms a part of the inlet chamber 12.

The shell-supporting flange 40 and flange 41 of the body are so located that the vertical distance between the pole elements 26 and 38 from the valve seat 18 is just slightly greater than the effective width of the disc closure 19. Accordingly, when the electromagnet 16 is deenergized, permitting closure 19 to rest upon seat 18 to close ports 22, the top surface 44 of the closure is but a small distance from the poles formed by members 26 and 38, such, for example, as from 1/16" to 3/32". Accordingly, the reluctance of the magnetic circuit is minimized so that, upon the existence of current through windings 30, a substantial amount of force is exerted upon the closure 19 to lift it from the seat 18. The particular arrangement of the tubular member 17 provides for a large flow of fluid for the small movement of the closure.

The reluctance of the magnetic circuit apart from the armature closure 19 is minimized by having only one joint therein at the tapered opening 36. This joint is made over a substantial area, the head 27 being of substantial diameter and width. The wedging relation that exists between the head 27 and the shell 33 further ensures close contact between the head 27 and shell 33.

The shell 33, closure 19, and core 25 are of such material as does not remain magnetized after deenergization of the coil 30. Accordingly, on deenergization thereof, the closure 19 is released substantially immediately by gravity to return to seat 18.

Referring to the form of the invention illustrated in Fig. 3, the electromagnet structure is similar to that of Fig. 1. In the present instance, the valve body 10 is the same as that illustrated in Fig. 1. The electromagnet core 45 and shell 46 are substantially the same as core 25 and shell 33. In the present instance, however, the polar area at the lower end of the shell 46 is provided in a different manner. The closure 19a is formed with an upstanding peripheral cylindrical flange 47 which telescopes closely within the lower end of the shell, a clearance of .005", for example, being provided.

The reluctance added to the magnetic circuit at the polar area varies directly with the air gap distance and inversely with the cooperating area. In the present form, the air gap between shell 46 and flange 47 is kept exceedingly small and invariant. Since the closure 19a moves only through a small distance, the change in polar area (as the closure member moves) between the shell 46 and the flange 47 is insignificant in comparison with the total polar area for either position of the closure. Accordingly, the present form largely eliminates added reluctance for the pole formed at the shell 46, and improved operation can be achieved.

In the present form, the core 45 is secured to the shell in a manner similar to that illustrated in Fig. 1, an enlarged integral head 27a of core 45 being secured in a tapered recess 36a by a nut 37a and cap 35a. In the present instance, the shell 46 at the place of juncture with the head 27a is of increased thickness tapering outwardly to the cylindrical portion of shell 46. Thus the magnetic lines of force extend in a straight path to this cylindrical portion, instead of the somewhat tortuous path shown in Fig. 1. A corresponding reduction in magnetic reluctance is thus obtained.

In some installations, it may be desirable to isolate the magnet windings 30 from the fluid controlled. The valve illustrated in Fig. 3 is arranged to accomplish this function in a simple manner. For this purpose, an annular wall or partition 48 of non-magnetic material is provided, extending between the inside surface of shell 46 and the pole piece 49.

To facilitate assembly of the core 45 and the shell 46, the partition 48 is permanently secured only to the shell, as by being welded thereto in a fluid-tight manner indicated at 50. The partition 48 is arranged to form a fluid-tight joint with the pole piece 49 upon assembly of the core 45 with the shell 46. For this purpose, the partition 48 has an annular flange 48a circumscribing the pole piece 49. This flange 48a urges a packing ring 51 of yielding material against the pole piece 49. An appropriate groove may be provided in the pole piece for retaining the packing ring 51.

The partition 48 is shown in Fig. 3 as arranged to provide a space for accommodating the flange 47 of the closure 19a, as by having a circular wall or skirt portion 48b, of about the same diameter as the pole piece 49, for engaging the packing 51. This skirt 48b extends upwardly a suitable distance beyond the flange 47 where it is joined to an outwardly extending portion 48c, joined to the shell 46 by the weld 50.

The inventor claims:

1. In combination: a valve body having an inlet and an outlet; wall means extending across said body separating said inlet and said outlet, and dividing said body into an inlet and an outlet chamber; said wall means having upper and lower spaced parts, connected by an intermediate section of the wall means; a tubular member having a down-turned flange on one end forming an annular space and accommodated in the upper wall part; there being a flat annular surface on the flange end of said tubular member, and a plurality of ports in communication with said annular space; the lower end of said tubular member being accommodated in the lower wall part, the interior of the tubular member being in communication with the inlet chamber; the outlet chamber communicating with the inlet chamber only through said annular space; and a disc closure in said inlet chamber and cooperable with said annular ported surface of said tubular member.

2. In combination: a valve body having an inlet opening and an outlet opening, as well as wall means extending between the openings, to define within said body an inlet chamber and an outlet chamber; said wall having a pair of spaced openings; a conduit means fixed in the openings, the interior of the conduit means being in constant communication with the inlet chamber via one end of the conduit means; means forming an annular valve seat about the other end of the conduit means, there being a plurality of annularly arranged ports through said valve seat and in communication with the outlet chamber; and a valve closure cooperating with said seat to close the said other end of the conduit means as well as said ports; said conduit means thus serving to keep the two chambers out of communication while the valve is closed.

References Cited in the file of this patent
UNITED STATES PATENTS
2,353,848   Ray _____ July 18, 1944